United States Patent
Meissner et al.

(10) Patent No.: US 6,915,838 B2
(45) Date of Patent: Jul. 12, 2005

(54) CAST CERAMIC ANODE FOR METAL OXIDE ELECTROLYTIC REDUCTION

(75) Inventors: David C. Meissner, Charlotte, NC (US); Ashvin Srivastava, Sarasota, FL (US); Jeffrey B. Musat, Canton, OH (US); Jeffrey K. Cheetham, N. Canton, OH (US); Abid Bengali, Naperville, IL (US)

(73) Assignee: Pel Technologies LLC, Canton, OH (US)

( * ) Notice: Subject to any disclaimer, the term of this patent is extended or adjusted under 35 U.S.C. 154(b) by 0 days.

(21) Appl. No.: 10/641,635

(22) Filed: Aug. 15, 2003

(65) Prior Publication Data
US 2004/0037771 A1 Feb. 26, 2004

Related U.S. Application Data

(60) Provisional application No. 60/405,021, filed on Aug. 21, 2002.

(51) Int. Cl.$^7$ .............................................. B22D 27/02
(52) U.S. Cl. ....................................... 164/470; 164/133
(58) Field of Search ................................. 164/470, 133, 164/122, 335

(56) References Cited

U.S. PATENT DOCUMENTS

| | | | |
|---|---|---|---|
| 6,375,813 B1 * | 4/2002 | Hryn et al. ............ | 204/290.01 |
| 6,758,991 B2 * | 7/2004 | DiMilia et al. .......... | 252/519.1 |

* cited by examiner

Primary Examiner—Tom Dunn
Assistant Examiner—Len Tran
(74) Attorney, Agent, or Firm—Dougherty, Clements, Hofer & Bernard

(57) ABSTRACT

The invention is a method for producing a cast ceramic anode for metal oxide electrolytic reduction by feeding metallic iron and metallic nickel in solid form to an oxidizing reactor; melting and oxidizing the iron and nickel and forming molten nickel ferrite; mixing the molten nickel ferrite with dopant in a holding vessel such as ladle or tundish to increase electrical conductivity of the mixture, and casting the mixture into a mold to form a near net shape of the desired anode. Apparatus for carrying out the method, and the resulting product are also disclosed.

14 Claims, 4 Drawing Sheets

CAST CERAMIC ANODE FOR METAL OXIDE ELECTROLYTIC REDUCTION

CROSS REFERENCE TO RELATED APPLICATION

This application claims the benefit of U.S. Provisional Patent Application Ser. No. 60/405,021, filed Aug. 21, 2002.

FIELD OF THE INVENTION

The present invention relates to a method and apparatus for producing a cast ceramic anode for metal oxide electrolytic reduction, and a cast ceramic anode product.

BACKGROUND OF THE INVENTION

Since the advent of the electrolytic reduction process for producing aluminum, the anodes used have been made of carbon which is consumed during the electrolytic reduction process. In the more recent past (20 years) there has been an effort to produce an inert anode or electrode that is not consumed during reduction. Metal anodes, ceramic anodes, and cermet anodes have been proposed for development. According to published patents, the best available practice to produce a ceramic anode heretofore has been to mix metal oxide powders with a binder, press the mixture at very high pressures, then sinter at high temperature. Specifically, nickel ferrite ($NiFe_2O_4$) powder has been mixed with a binder, and the mixture pressed and sintered to make the ceramic anode. The manufacture of a nickel ferrite powder is a complex and expensive process. The subsequent processing of the nickel ferrite by blending and mixing with an organic binder, followed by pressing at high pressure, then followed by sintering at high temperatures (greater than 1300 C) for long times, is also quite complex and expensive.

DESCRIPTION OF THE PRIOR ART

Applicants are aware of the following U.S. Patents concerning ceramic electrodes for electrolytic reduction of aluminum:

| U.S. Pat. No. | Inventor | Title |
| --- | --- | --- |
| 6,426,195 B1 | Ray et al. | INERT ANODE CONTAINING OXIDES OF NICKEL, IRON AND ZINC USEFUL FOR THE ELECTROLYTIC PRODUCTION OF METALS |
| 6,416,649 B1 | Ray et al. | ELECTROLYTIC PRODUCTION OF HIGH PURITY ALUMINUM USING CERAMIC INERT ANODES |
| 4,187,155 | deNora et al. | MOLTEN SALT ELECTROLYSIS |

SUMMARY OF THE INVENTION

The invention provides a method for producing a cast ceramic anode for metal oxide electrolytic reduction by feeding metallic iron and metallic nickel in solid form to an oxidizing reactor; melting and oxidizing the iron and nickel and forming molten nickel ferrite; transferring the molten nickel ferrite material into a holding vessel such as a ladle or tundish, and casting the molten material into a mold to form a near net shape of the desired anode. The material in the holding vessel may be blown with an oxygen-containing gas for stirring of the molten material and the oxidation of any remaining metal. Metal containing compounds, especially oxides, may be added to dope the ferrite, which increases the electrical conductivity and mechanical strength of the ferrite.

The invention also comprises apparatus for producing a cast ceramic anode for metal oxide electrolytic reduction, comprising an oxidizing reactor; means for feeding metallic iron and metallic nickel to the oxidizing reactor; a ladle or tundish positioned for receiving molten material from the reactor; means for adding metal oxide dopants to the ladle or tundish; means for blowing an oxygen-containing gas into the ladle or tundish for stirring and oxidation of any remaining metal; a mold positioned to receive molten material from the ladle or tundish; and means for discharging molten metal from the ladle or tundish into the mold to form the anode. During the solidification process, an electrical conductor rod made of nickel may be inserted into the still molten casting. After removal of the cast anode from the mold, a cast anode of correct shape with the electrical conductor attached results, which may be heat-treated in an oxygen-containing atmosphere. This post heat treatment is for stress relief, phase composition adjustmaent, as required, and final microstructure adjustment.

The invention also comprises the product of the method, a cast ceramic anode for metal oxide electrolytic reduction. The ceramic consists of one or more of nickel ferrite, iron ferrite and nickel oxide, plus any added metal oxide dopants. Dopants may be zinc, cobalt, or lithium compounds, preferably added as oxides. Alternatively, dopants can be added in metal sulfide or carbonate form, but they will be present in the final product as oxides.

OBJECTS OF THE INVENTION

The principal object of the present invention is to provide a process for the manufacture of ceramic type inert anodes that is simpler and more cost efficient than the current state of the art of ceramic anode manufacture.

Another object of the invention is to produce a ceramic anode that has as good or better properties of conductivity, strength, and resistance to attack by the electrolyte than sintered ceramic anodes.

Another object of the invention is to provide a process that allows near net shape casting of an inert ceramic anode.

A further object of this invention is to provide apparatus for the manufacture of ceramic type cast inert anodes.

BRIEF DESCRIPTION OF THE DRAWINGS

The foregoing and other objects will become more readily apparent by referring to the following detailed description and the appended drawings in which.

DETAILED DESCRIPTION

Figure 1:
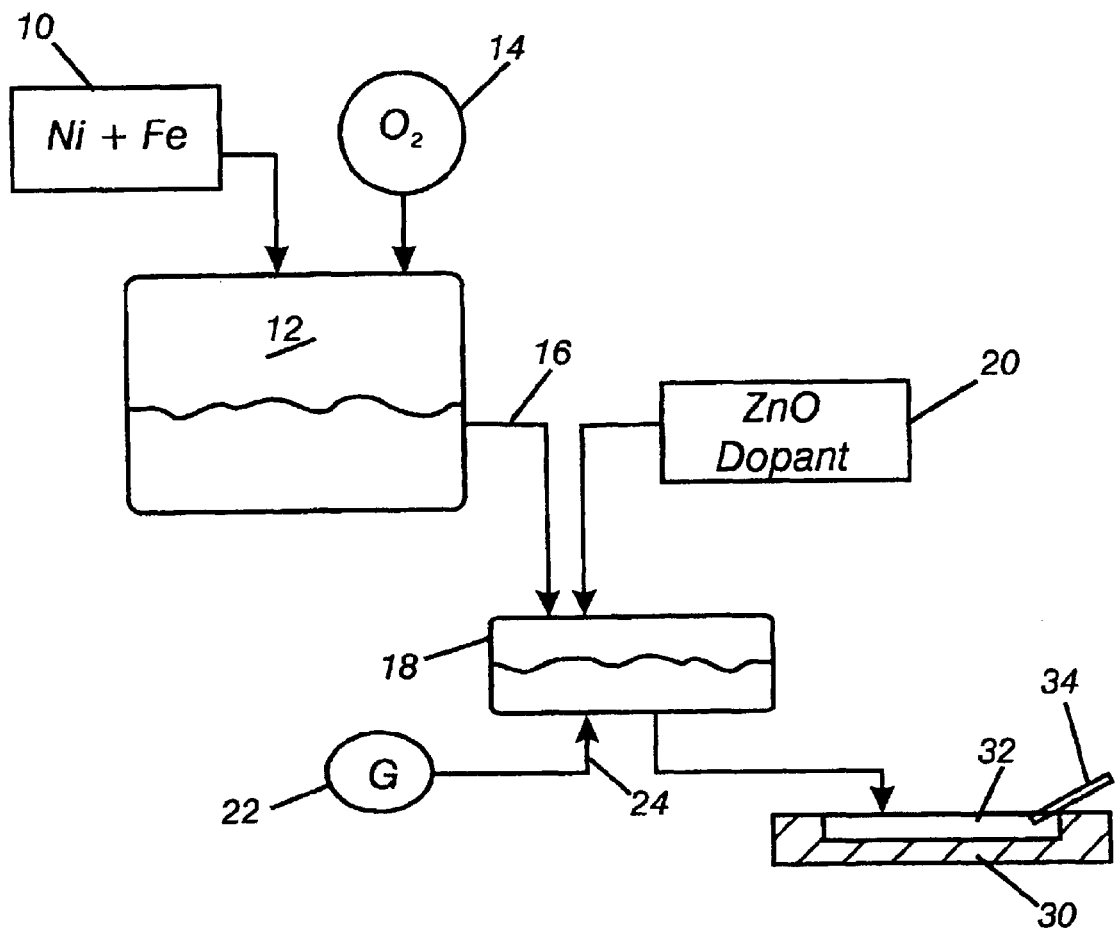
FIG. 1 is a schematic diagram of the method and apparatus of the preferred embodiment of the invention.

Referring now to the drawings, and particularly to FIG. 1, molten metal oxide is formed by oxidizing iron and other metal(s) to form a molten ferrite of the general formula

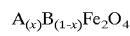

where A and B are divalent metal ions such as Mg, Ni, Mn, Co, Fe; and x can vary from 0 to 1.0. The molten ferrite is then mixed with a dopant to increase its electrical conductivity. The molten mixture may be blown with an oxygen containing gas for stirring and oxidation of any remaining metal or it may be stirred with an inert gas. The molten mixture of ferrite and dopant is then cast, solidified and cooled. The mixture may be cast into a near net shape of the desired cermet anode. An electrical connector may be attached to the cermet anode by cementing after cooling, or by insertion during the time the anode is molten in the mold. After removal from the mold the cast anode with attached electrical connector may be post-heat treated. This treatment may be an annealing step carried out in an oxygen-containing atmosphere.

In a preferred embodiment, metallic iron and metallic nickel in briquet form from source 10 are fed to an oxidizing reactor 12 wherein the iron and nickel are melted and oxidized by oxygen from source 14. The iron and nickel are fed into the reactor in a molar ratio of $$Fe/Ni=2/1.$$

A molten nickel ferrite of formula $Ni\ Fe_2O_4$ is formed.

It is possible to utilize a molar ratio of Fe/Ni greater than 2/1 to produce a mixture of nickel ferrite ($Ni\ Fe_2O_4$) and iron ferrite ($Fe_3O_4$). It is also possible to operate with a molar ratio of Fe/Ni less than 2 in order to produce a nickel ferrite plus excess nickel oxide (NiO).

The molten nickel ferrite is discharged from the oxidizing reactor 12 through outlet 16 at a temperature sufficient to maintain it in the molten state plus sufficient superheat to melt any dopants being added thereto. The molten nickel ferrite discharges into a receiving and holding vessel 18 such as a tundish or ladle. Dopants 20, such as zinc oxide, cobalt oxide, or lithium oxide, can be added and mixed into the molten nickel ferrite in the holding vessel wherein the dopants are melted. The molten oxide may be stirred with an oxygen containing gas 22 and any remaining metal is oxidized. The dopant that is added can be in the form of powder or larger particles that are readily melted. The ladle or tundish 18 can be heated to prevent the molten mixture from solidifying.

Vacuum degassing of the ladle may be employed to remove entrapped gases and minimize porosity of the resulting final cast anode product.

The mixture of nickel ferrite and dopant is then removed from the holding vessel and cast into a mold 30 to form a near net shape inert anode 32, after which it is allowed to cool. Controlled cooling rates, post-heat treatment and bubbling of argon gas for coalescing and removal of entrapped gases may be employed as methods for reducing stresses and porosity in the cast anode. During the solidification process an electrical connector rod 34 made of nickel may be inserted into the still molten nickel ferrite casting. The post-heat treatment may include an annealing and/or phase composition adjustment step with an oxygen-containing gas after the cast anode with attached connector rod is removed from the mold. The post heat-treatment step may include a soak at a temperature of from 1200° C. to 1400° C. in an oxygen-containing gas to further oxidize any remaining metallic nickel and metallic iron. This soak may then be followed by a slow cooling to a temperature below $1200^N C$ and then a second soak in an oxygen-containing gas at a temperature below $1200^N C$. The second soak causes phase composition adjustment and microstructure adjustment. The overall reaction taking place in the post-heat treatment step may be represented by the following reaction:

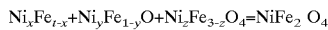

$$Ni_xFe_{t-x}+Ni_yFe_{1-y}O+Ni_zFe_{3-z}O_4=NiFe_2\ O_4$$

The finished product is a cast ceramic inert anode of correct shape with the electrical connector attached.

An alternative post treatment is hot isostatic pressing of the cast anode at a temperature of at least 1000° C. and a pressure of at least 1360 bar for a period of from about 4 to about 8 hours.

Molten and cast material inherently has better resistance to attack by molten salt bath solution than a sintered material because the true density of the cast material is greater than that of sintered material because of the lack of voids. Grain size is larger in cast material than in sintered material, which results in less voids in the cast material.

Alternative Embodiments

Iron and nickel feed material may be provided in metallic form other than briquets, such as from punchings, turnings, or other high purity solid form.

Figure 2:
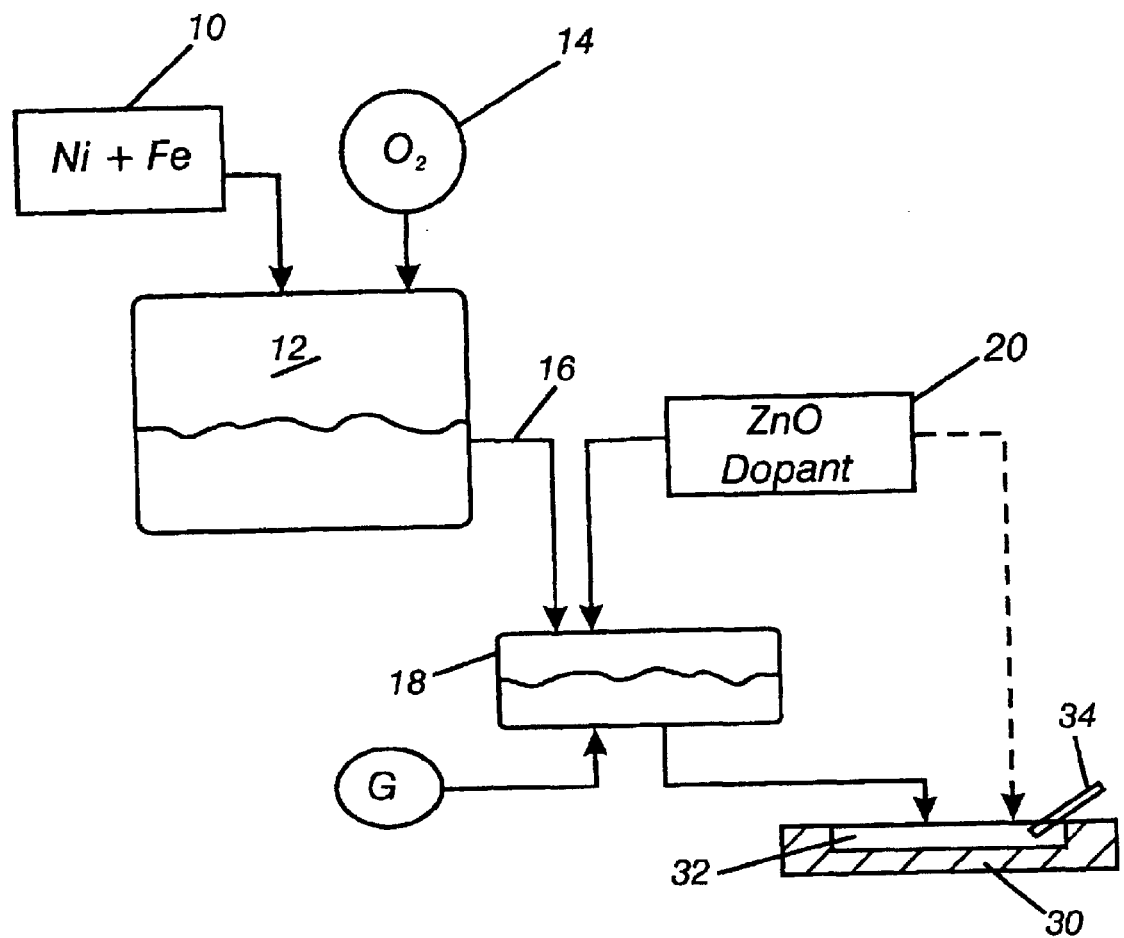
FIG. 2 is a schematic diagram of the method and apparatus of an alternative embodiment of the invention.

In an alternative embodiment of the method, as shown in FIG. 2, a dopant such as zinc oxide may be added between the melting oxidizing reactor and the tundish or ladle by introducing it into the discharge runner between the oxidizing reactor and the tundish. The dopant may be added in powder form or in lump form.

In another alternative embodiment of the method, as shown by dotted lines in FIG. 2, the dopant may be added directly to the casting mold before or during filling of the mold with the molten nickel ferrite. The dopant may be added in the form of powder or lump.

Figure 3:
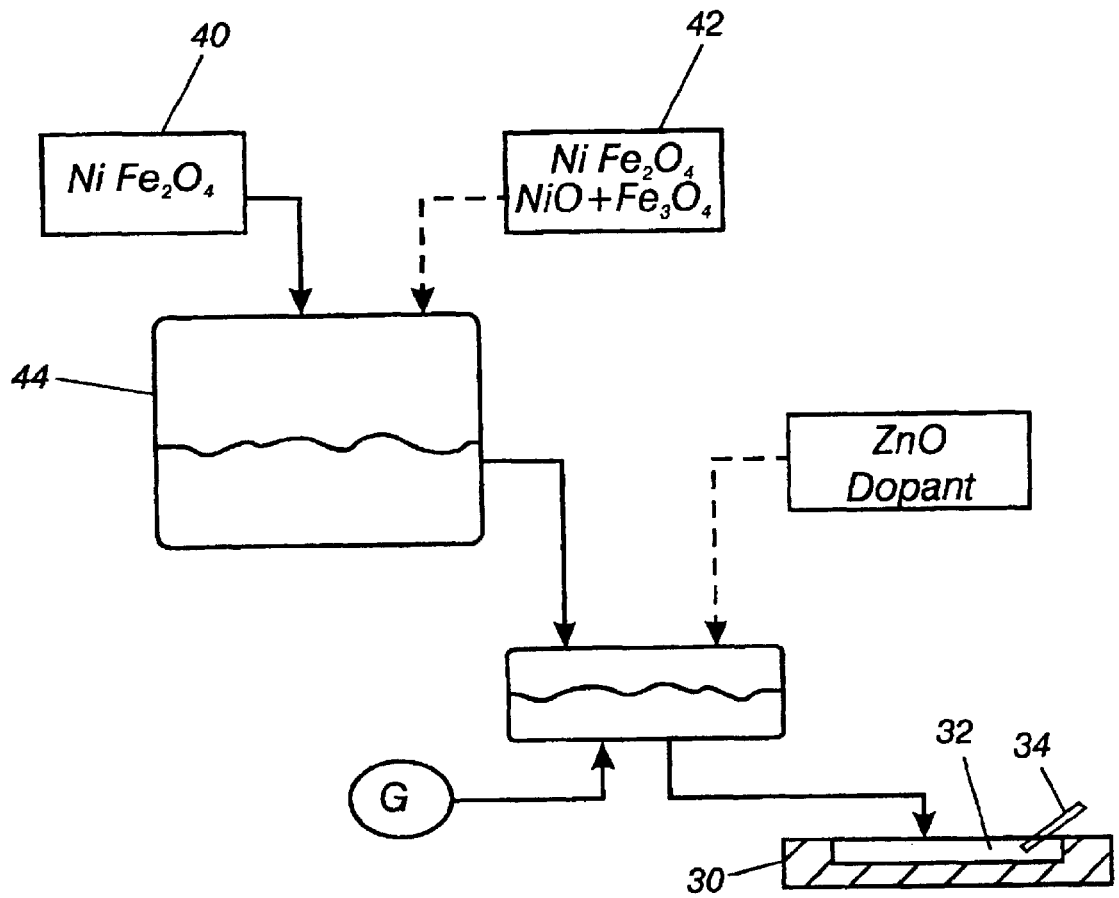
FIG. 3 is a schematic diagram of the method and apparatus of another alternative embodiment of the invention which utilizes a melting furnace rather than an oxidizing furnace.

In the alternative embodiment shown in FIG. 3, solid nickel ferrite 40, or a mixture of nickel ferrite, nickel oxide and iron ferrite, or iron-containing and nickel-containing compounds 42 are melted in a melting furnace or vessel 44, which need not be an oxidizing vessel, to form molten nickel ferrite. The melting vessel can be a gas fired furnace, induction furnace, or electric arc furnace.

Figure 4:
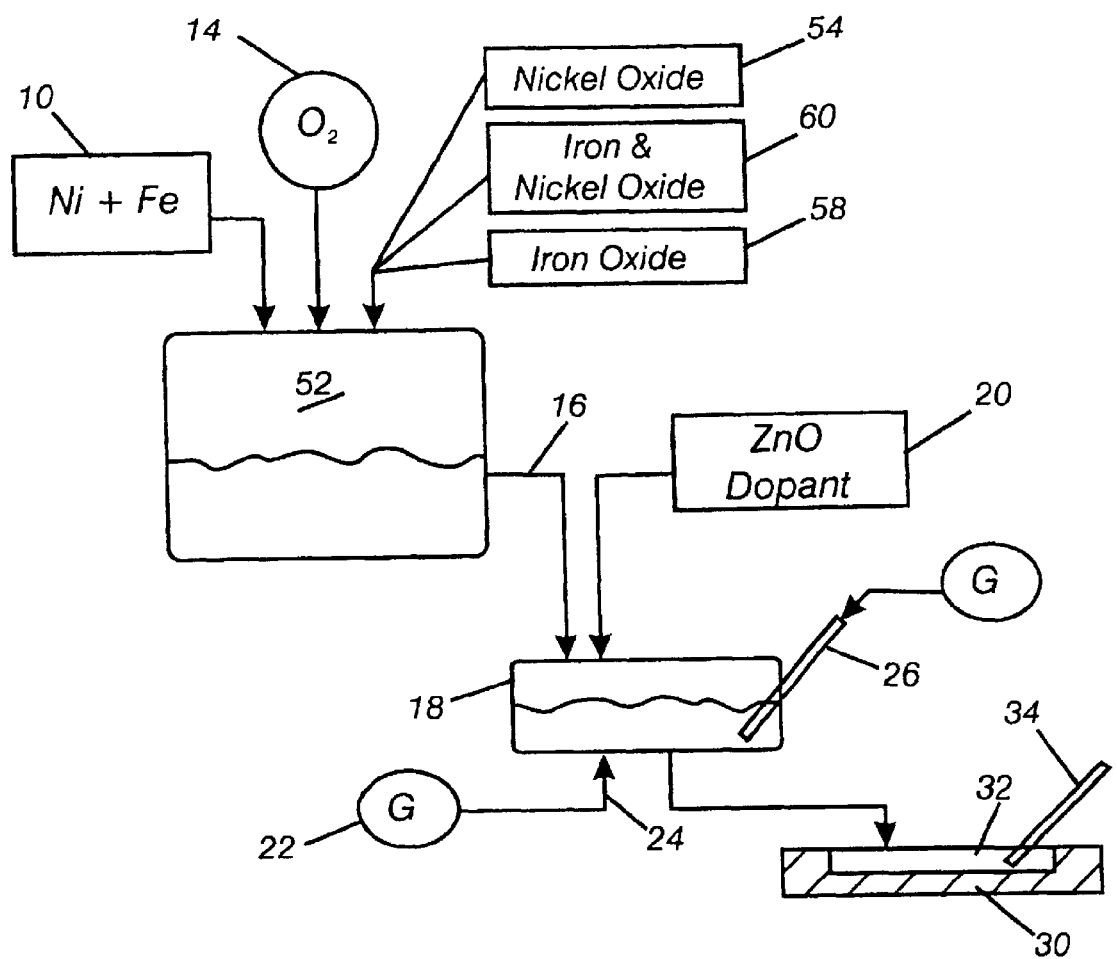
FIG. 4 is a schematic diagram of alternative embodiment of the invented method utilizing a variation of feed materials to the oxidizing furnace.

In the alternative embodiment shown in FIG. 4, mostly metallic iron and nickel are fed to reactor 52 along with some iron oxide and/or nickel oxide, which are melted and oxidized to form molten nickel ferrite. There is sufficient exothermic heat available from the oxidation of nickel and iron to allow the use of nickel oxide and iron oxide as feed materials to the reactor. The molten nickel ferrite is then discharged into a ladle or tundish and further treated according to the remaining steps of the method to form a cast cermet anode. In this embodiment, solid nickel oxide 54, or iron oxide 58, or a mixture of nickel oxide and iron oxide 60 is introduced to and melted in an oxidizing reactor or vessel 52, to form molten nickel ferrite. Spent anodes may be utilized as all or part of the oxide feed material.

It is also to be understood that a ceramic type inert anode made from a ferrite may be used in electrolytic reduction processes besides aluminum reduction, such as electrolytic reduction of magnesium, lithium, or calcium. It is also understood that a ceramic type inert anode made from a ferrite may be used as an anode in the brine electrolysis process in the chlor-alkali industry.

Summary of the Achievement of the Objects of the Invention

From the foregoing, it is readily apparent that we have invented an improved process for the manufacture of cast ceramic type inert anodes that is simpler and more cost efficient than the current state of the art of ceramic anode manufacture, and that allows near net shape casting of an inert ceramic anode; a cast ceramic anode product that has as good or better properties of conductivity, strength, resistance to attack by the electrolyte than sintered ceramic anodes, and apparatus for the manufacture of ceramic type cast inert anodes.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. A method for producing a cast ceramic anode for metal oxide electrolytic reduction, comprising the steps of:
   feeding metallic iron and metallic nickel in solid form to an oxidizing reactor;
   melting and oxidizing the iron and nickel and forming molten nickel ferrite;
   discharging molten nickel ferrite from the oxidizing reactor at a temperature sufficient to maintain the molten nickel ferrite in the molten state;
   adding a dopant to the nickel ferrite and forming a mixture; and
   casting the mixture into a mold to form a near net shape of the anode.

2. A method according to claim 1 further comprising attaching an electrical connector to said anode.

3. A method according to claim 1 wherein the metallic iron and metallic nickel are fed in briquet form to the oxidizing reactor.

4. A method according to claim 1 wherein the dopant is selected from the group consisting of zinc, cobalt, or lithium compounds.

5. A method according to claim 4 wherein the compounds are oxides.

6. A method according to claim 4 wherein the compounds are carbonates or sulfides.

7. A method according to claim 1, further comprising stirring molten material in said ladle or tundish with oxygen-containing gas to also oxidize any remaining metal.

8. A method according to claim 1, further comprising a post-casting heat treatment of the cast anode in an oxygen-containing atmosphere.

9. A method according to claim 8 wherein said post-casting heat treatment is an anneal of the cast anode.

10. A method according to claim 8 wherein said post-casting heat treatment is a phase composition adjustment comprising: soaking the cast anode at a temperature of from 1200° C. to 1400° C. for a sufficient time to oxidize any remaining metallic nickel and metallic iron.

11. A method according to claim 10 further comprising slow cooling the cast anode to a temperature below 1200° C.

12. A method according to claim 11 further comprising soaking said anode in an oxygen-containing gas for a second period of time at a temperature below 1200° C. for final phase composition adjustment and microstructure adjustment.

13. A method according to claim 11 further comprising hot isostatic pressing of the cast anode at a temperature of at least 1000° C. and a pressure of at least 1360 bar for a period of from about 4 to about 8 hours.

14. A method for producing a cast ceramic anode for metal oxide electrolytic reduction, comprising the steps of:
   feeding at least one compound selected from the group consisting of nickel oxides, iron oxides, nickel ferrite, iron sulfides, nickel sulfides, iron carbonates, nickel carbonates, or mixtures thereof, to the melting vessel;
   melting the compounds and forming molten nickel ferrite;
   discharging molten nickel ferrite from the melting vessel at a temperature sufficient to maintain the molten nickel ferrite in the molten state;
   adding a dopant to the nickel ferrite to form a mixture; and
   casting the mixture into a mold to form a near net shape of the anode.

* * * * *